Figure 1:
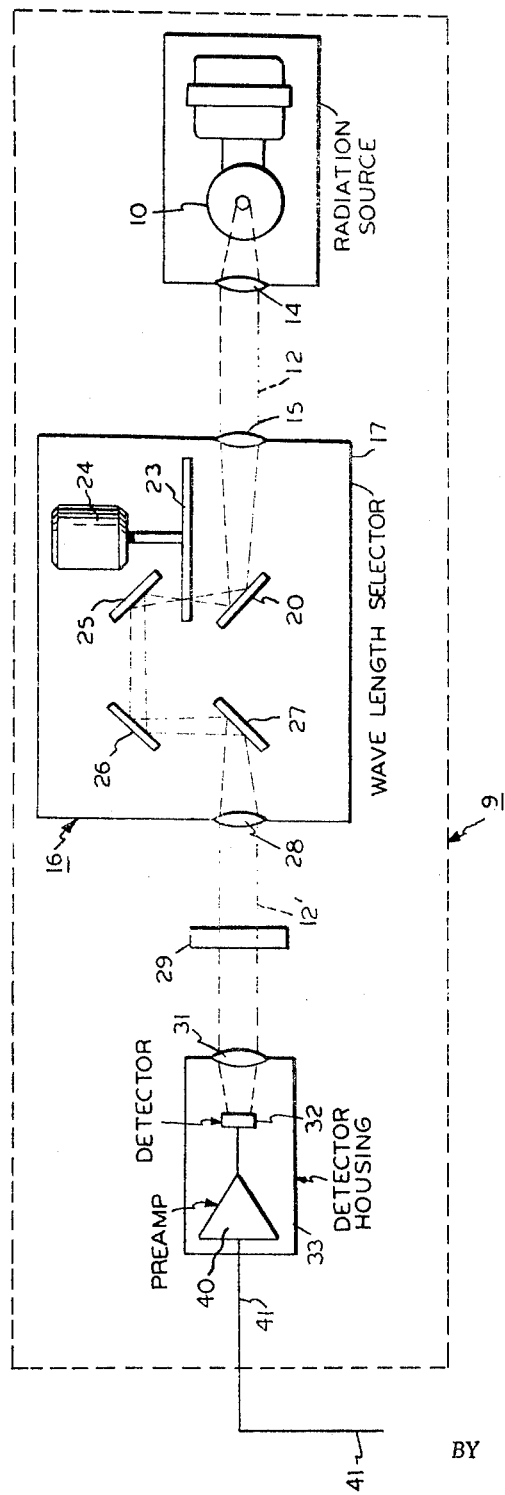

Sept. 20, 1966 N. B. KELLY 3,273,448
ANALYTICAL LOGARITHMIC RATIO DETERMINATION APPARATUS
Filed Dec. 6, 1962 4 Sheets-Sheet 1

INVENTOR
NEAL B. KELLY

BY Harry J. McCauley

ATTORNEY

Sept. 20, 1966 N. B. KELLY 3,273,448
ANALYTICAL LOGARITHMIC RATIO DETERMINATION APPARATUS
Filed Dec. 6, 1962 4 Sheets-Sheet 2
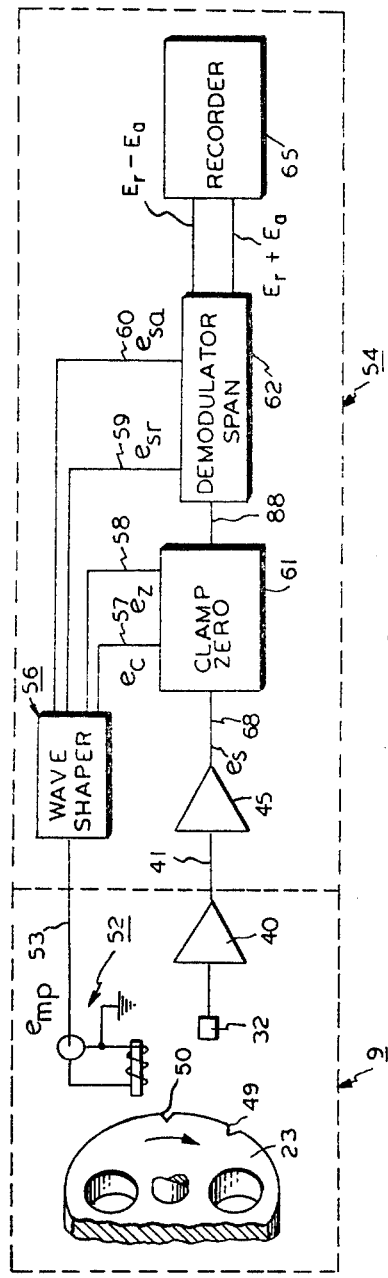
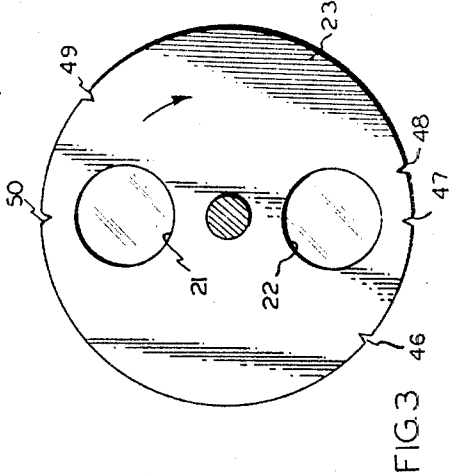
INVENTOR
NEAL B. KELLY
BY *Harry J. McCauley*
ATTORNEY Sept. 20, 1966   N. B. KELLY   3,273,448
ANALYTICAL LOGARITHMIC RATIO DETERMINATION APPARATUS
Filed Dec. 6, 1962   4 Sheets-Sheet 4

INVENTOR
NEAL B. KELLY
BY Harry J. McCauley
ATTORNEY

United States Patent Office 3,273,448
Patented Sept. 20, 1966

3,273,448
ANALYTICAL LOGARITHMIC RATIO DETERMINATION APPARATUS
Neal B. Kelly, Wilmington, Del., assignor to E. I. du Pont de Nemours and Company, Wilmington, Del., a corporation of Delaware
Filed Dec. 6, 1962, Ser. No. 242,740
2 Claims. (Cl. 88—14)

This invention relates to an improved method and apparatus for accumulating and processing physical data required for a comparison in the form of the logarithm $R/A$, and particularly to such a comparison expressible, within acceptable tolerances, as the first term $(R-A)/(R+A)$ of the series expansion representative of the logarithm of $R/A$.

There are a number of physical comparisons which are particularly adapted to expression as logarithmic ratios, or approximations thereto, in order to obtain a continuous, graphic, linear output representative of a characteristic under examination. By way of example solely, these include the evaluation of sound absorption properties throughout more or less extensive frequency ranges for different materials in comparison with a reference material, or a graphic sound level recording system adapted to the recording of changing sound levels over a period of time. Another application is the monitoring of the decaying intensity of radioactive materials. Yet another application of considerable practical importance is double beam photometric analysis, and this invention is hereinafter explained with particular reference to such analysis as the detailed example.

Unless physical data is acquired at substantially exactly the same instant of time, which is rarely practicable, it is difficult to effect a comparison at high repetition rates. As regards the double beam photometric analysis hereinbefore mentioned, U.S. application S.N. 242,741, filed of even date herewith, property of common assignee, now abandoned, teaches a method and apparatus utilizing two pulsating electrical signals, of which the first incorporates pulses of the same polarity whereas the second incorporates pulses of opposite polarity, these pulses being quantitatively representative of analytical radiation and reference radiation in alternate sequence. The obtainment of rapid rate cyclical polarity reversal is, however, not always convenient in practice, and an object of this invention is to provide for physical data accumulation, thereby dispensing with the necessity for cyclical polarity reversal.

Figure 5:
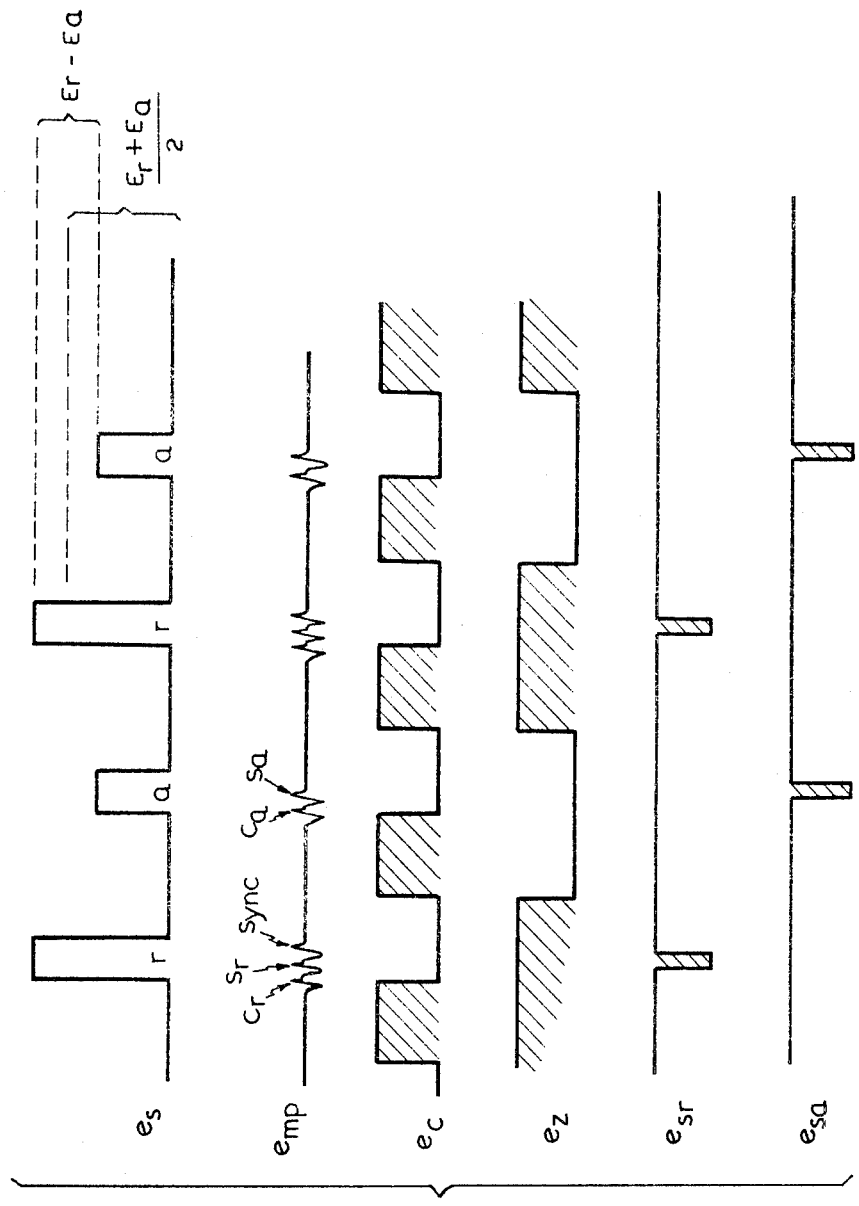
Figure 6:
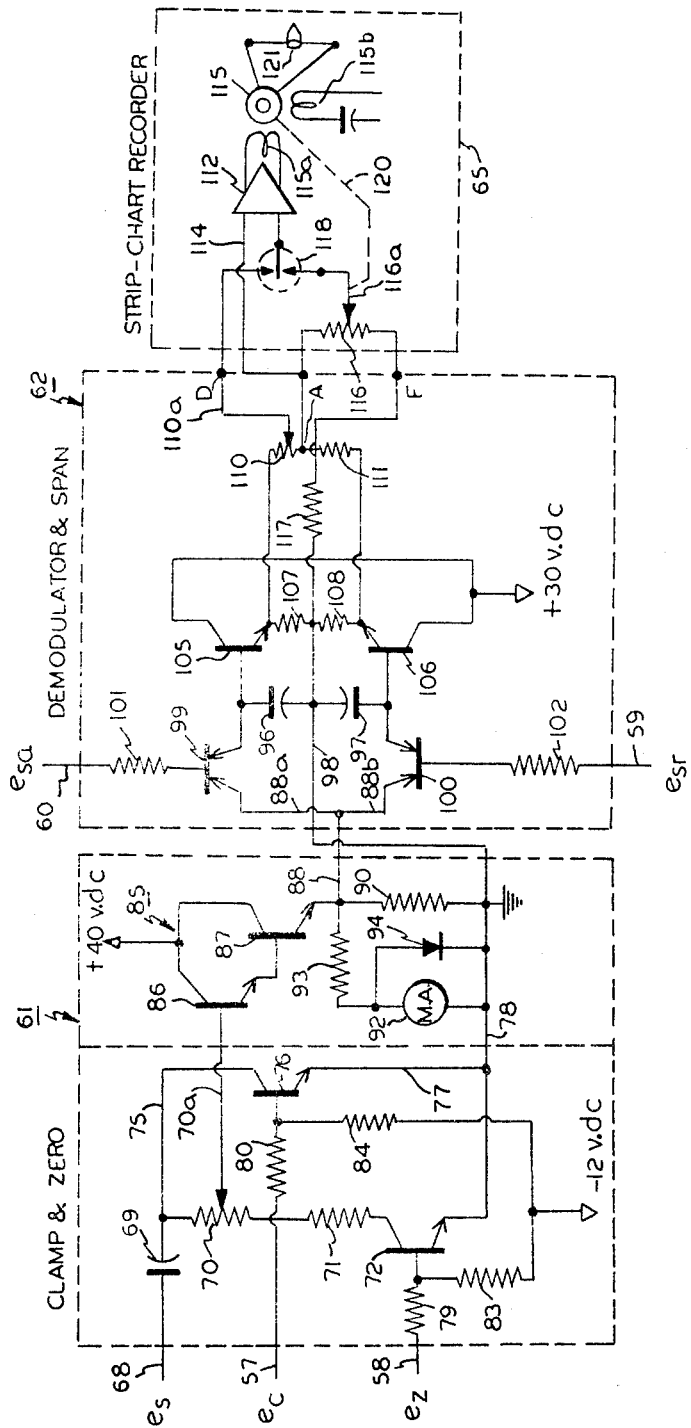

Other objects of this invention include the provision of a method and apparatus for physical data processing which is particularly suited to the employment of transistors as electronic circuit elements, and apparatus which is economical in first price and maintenance, and of rugged construction especially desirable in industrial service. The manner in which these and other objects of this invention are attained will become apparent from the detailed description and the following drawings, in which:

FIG. 1 is a schematic diagram of a typical optical arrangement employed for double beam photometric analysis which develops physical data of a type constituting the as-received input to the apparatus of this invention, FIG. 2 is a block diagram generally representative of a preferred embodiment of electrical circuit according to this invention adapted to be utilized in conjunction with apparatus such as that shown in FIG. 1, detailing schematically the synchronizing signal pick-up device provided for operation in cooperation with the rotating radiation chopping wheel of the optical apparatus, which chopping wheel is shown only in fragmentary perspective in this view, FIG. 3 is a side elevation of the rotating radiation chopping wheel of FIGS. 1 and 2, FIG. 4 is a representation of the actual shape of pulse signal corresponding to the reference radiation, $r$, and the analytical radiation, $a$, in alternation obtained with the apparatus of FIGS. 1 and 2 during a single complete scanning cycle, FIG. 5 is a partially schematic representation of the pulse signal of FIG. 4, denoted here as $e_s$, shown in somewhat idealized form, in relative time and polarity relationship with respect to the pulsed synchronizing signal, $e_{mp}$, and the several subordinate pulse controls introduced into the data handling circuit of this invention responsive to $e_{mp}$, and FIG. 6 is a circuit diagram of a preferred embodiment of data handling apparatus according to this invention operative on the pulse signal of FIG. 4 and performing the several computation steps effecting the comparison sought in approximation of the form $\log R/A$.

Generally, this invention consists of a method of accumulating and processing physical data required for a comparison in the form of an approximation of the $\log R/A$ as a function of the first term $(R-A)/(R+A)$, of the series expansion representative of the $\log R/A$ comprising, in sequence, generating voltage pulses in alternation which correspond to the quantity A and the quantity R, respectively, storing individual separate capacitive charges of magnitudes which are functions of the voltage pulses, generating a D.-C. voltage signal $E_a$ which is a function of the capacitive charge corresponding to the quantity A, generating a D.-C. voltage signal $E_r$ which is a function of the capacitive charge corresponding to the quantity R, computing as one term the difference $E_r-E_a$ and as another term the sum $E_r+E_a$, and then computing the ratio $(E_r-E_a)/(E_r+E_a)$ as an approximation of the $\log (E_r/E_a)$, together with apparatus for performing the method.

The invention is described with particular application to double beam photometric analysis; however, it is equally applicable to many other physical system comparisons as hereinbefore mentioned, and, of course, to other optical comparisons also, such as, for example, the measurement of the fluorescence of solids suspended in liquids. In general, any comparison involving two parameters which are counterparts for the analytical and reference radiations hereinafter described can be effectuated according to this invention.

In double beam photometric analysis two beams of radiation are employed, the first of which can be thought of in terms of function as the "analytical" beam, because it is preselected as regards its wavelength, $\lambda_a$, so that it is preferentially absorbed by a constituent to be analyzed, and the second as the "reference" beam, because it is preselected as regards its wavelength, $\lambda_r$, so as to be substantially free of absorption by the constituent to be analyzed but so as to be absorbed in substantially the same proportion as the analytical beam by any other constituents in the sample. In absorption analysis the characteristic of interest is the absorbance, which is the logarithm of the reciprocal of the transmittance, and thus is nonlinear in nature. Absorbance difference, $\Delta A$, where two beams of radiation are employed as hereinbefore taught is a direct measure of the constituent in analysis, which can be written as $\log I_r/I_a$, where $I_a$ and $I_r$ are, respectively, the intensities of the fractions of the analytical and reference radiation beams transmitted by the sample in analysis.

It has been found that, to a good approximation, $$\Delta A = K\left[\frac{I_r - I_a}{I_r + I_a}\right]$$

i.e., the first term of the series expansion representing $\log I_r/I_a$, upon substitution of the specific terms and some algebraic rearrangement in the general series expansion for logarithms set out in the Handbook of Chemistry and Physics, 41st Ed., p. 323.

The measuring of the two intensities, $I_r$ and $I_a$, and their manipulation as numerator and denominator terms of the $\Delta A$ equation, is efficiently accomplished by the use of a single radiation detector to view the fractions of the two radiation beams transmitted by the sample in sequence and cyclically, while totally discontinuing radiation passage to the detector for finite time intervals after each radiation exposure, thereby generating two unique voltage pulses in alternation, one of which is a function of the fraction of analytical beam radiation transmitted by the sample and the other of which is a function of the fraction of reference beam radiation transmitted by the sample. Since the two measurement pulses are generated at different instants in time, but their electrical counterparts must be used simultaneously later in time, it is necessary to store the measures implicit therein, and this is conveniently accomplished according to this invention by generating individual capacitive charges of magnitudes which are functions of each, and thereafter resurrecting the measures from storage as a pair of D.-C. voltage signals, $E_a$ of which is a function of the capacitive charge corresponding to the fraction of the analytical radiation transmitted by the sample and $E_r$ of which is a function of the capacitive charge corresponding to the fraction of the reference radiation transmitted by the sample. Thereafter $E_a$ and $E_r$ are utilized in place of their respective radiation intensity counterparts, $I_a$ and $I_r$, to compute the difference term $E_r - E_a$ (corresponding to $I_r - I_a$), the sum term $E_r + E_a$ (corresponding to $I_r + I_a$) and, finally, the ratio $(E_r - E_a)/(E_r + E_a)$, which is a measure of the constituent in analysis.

Referring to FIGS. 1–3 particularly, the radiation-tight housing 9 contains the complete optical sub-assembly of the invention. Radiation source 10, which can conveniently be a Type 1209 auto spot light bulb, is powered from its own transformer 11. The radiation from the source, inclusive of the two radiation wavelengths $\lambda_a$ and $\lambda_r$ employed in the analytical and reference beams, respectively, is transmitted along path 12 via collimating lens 14 and focusing lens 15 to the wavelength selector, indicated generally at 16. The radiation thence passes to first reflecting mirror 20 and then through each of the interference filters 21 or 22 in sequence disposed circumferentially apart around light-impervious chopper wheel 23, which is rotated at a speed of typically 60 rev./sec. by motor 24. Filters 21 and 22 are chosen so that analytical radiation of wavelength $\lambda_a$ is transmitted by one (e.g., filter 21) and reference radiation of wavelength $\lambda_r$ is transmitted by the other (e.g., filter 22), each thereby passing their respective beams in sequence and in alternation via mirrors 25, 26 and 27, and collimating lens 28, to sample holder 29 disposed athwart the beam path 12′, and thence via focusing lens 31 to radiation detector 32. It will be noted that the radiation-impervious expanse of chopper 23 interrupts radiation passage for finite time intervals (in this instance equal one to another, due to the symmetrical placement of the equal-sized filters 21 and 22 diametrically opposite one another), so that zero radiation intensity impinges on detector 32 after each successive radiation exposure.

Radiation detector 32 can typically be a B3–SA14 (Infrared Industries), with radiation-responsive element connected in electrical circuit with A.-C. preamplifier 40, which is preferably a 3-transistor type providing both power and voltage amplification. Variable gain amplifier 45 (FIG. 2), connected in circuit with preamplifier 40 by conductor 41, can be of the conventional linear type utilized for high-fidelity audio amplification, with voltage gain continuously variable from about 10 to 10,000 by use of a 3-gang potentiometer, not detailed. The output from amplifier 45 is a pulsating electrical signal denoted as the pulse train $e_s$ made up of the $r$ and $a$ pulses in alternation possessing the actual shapes shown in FIG. 4, wherein the slopes at the pulse tops and between succeeding pulses result from A.-C. amplifier droop and the slopes of leading and trailing edges result from the sweep of the filters transverse the beam path (which thus presents first gradually increasing and then gradually decreasing radiation-transmitting areas in line with detector 32).

Precise time coordination of control with the pulses of $e_s$ is achieved by providing five peripheral trigger notches in chopper wheel 23 denoted 46, 47, 48, 49, and 50 which, respectively, generate, by conventional electromagnetic pickup indicated generally at 52, the pulses $C_r$, $S_r$, Sync, $C_a$ and $S_a$ making up pulse train $e_{mp}$ (refer also FIG. 5), which constitutes the control input passed via conductor 53 to the electronic sub-assembly of the apparatus denoted generally at 54, FIG. 2.

Pulse train $e_{mp}$ triggers a conventional wave shaper, indicated generally at 56, which consists of an array of digital logic elements inclusive of gates, a bistable multivibrator, fixed time monostable multivibrators and appropriate amplifiers for the performance of the time selection logic necessary to produce the control pulse trains $e_c$ (clamp), $e_z$ (zero), and $e_{sr}$ and $e_{sa}$ (strobe) shown in FIG. 5, which are applied to $e_s$ via conductors 57, 58, 59, and 60, respectively. The operations effected by the control pulse trains are: clamping and zero adjustment performed by $e_c$ and $e_z$, respectively, applied to a sub-circuit indicated generally at 61, FIG. 2, and demodulation and span selection performed by $e_{sr}$ and $e_{sa}$, respectively, applied to a sub-circuit indicated generally at 62, each of which sub-circuits incorporates its own power amplification stage as hereinafter described. The outputs from sub-circuit 62 constitute the two D.-C. voltage signals $(E_r - E_a)$ and $(E_r + E_a)$, applied separately to the circuit computing the ratio $(E_r - E_a)/(E_r + E_a)$, which is conveniently incorporated in the recorder sub-circuit, indicated generally at 65.

FIG. 6 is a circuit diagram showing a preferred embodiment of the principal features of electronic sub-assembly 54, the several voltage sources being indicated only schematically.

Referring to FIG. 6, $e_s$ is introduced to sub-circuit 61 via conductor 68 and coupling capacitor 69 (typically a 1 $\mu$f. size), which transmits a corresponding pulse to each of two parallel circuit branches, as hereinafter described. The first parallel branch incorporates potentiometer 70 (typically 20K ohms range), resistor 71 (typically 10K ohms) and transistor 72 (typically an N-P-N type 2N2221). The other parallel branch incorporates conductor 75 connecting with the collector of transistor 76 (typically an N-P-N type 2N2221) having its emitter connected via conductor 77 with line 78 running to ground, to which the emitter of transistor 72 is also connected. Transistors 72 and 76 are each operated in the switching mode, the former by zero selection pulse $e_z$ applied via conductor 58 and resistor 79 (typically 22K ohms) to the base element of transistor 72, and the latter by clamping pulse $e_c$ applied via conductor 57 and resistor 80 (typically 22K ohms) to the base element of transistor 76. A common negative biasing voltage source of, typically, −12 v. D.-C. is provided for between-pulse, open circuit maintenance of both of the transistors 72 and 76 by connection to their base elements through the respective resistors 83 and 84 (each typically 82K ohms).

The relatively weak $e_r$ and $e_a$ pulses drawn off via the tap 70a of potentiometer 70 are preferably amplified by a two-stage power amplification sub-circuit indicated generally at 85 incorporating first and second stage N-P-N transistors 86 and 87, respectively (typically type 2N2221), having their collectors connected to a positive polarity D.-C. source (typically +40 v. D.-C.). Tap 70a is connected to the base element of transistor 86 and the emitter element of the latter is connected to the base element of transistor 87 in conventional manner. The amplified $e_s$ output is drawn from the emitter of transistor 87, being introduced into the demodulation and span selection sub-circuit 62 via conductor 88. Load resistor 90 (typically 4.7K ohms) is provided between transistor 87 and ground, and a milliammeter 92 (typically 0–1 ma. range) is connected in shunt with resistor 90 via resistor 93 (typically 8.2K ohms), with an excess current protective diode 94 (typically a type 1N485) connected in shunt around the milliammeter.

The capacitive charge which is a function of pulse $a$ of $e_s$ is accumulated in capacitor 96, whereas the capacitive charge which is a function of pulse $r$ of $e_s$, is accumulated in capacitor 97 (typically each of 1 μf. size). Capacitors 96 and 97 are connected in mutually parallel relationship one with another across lead 98 running to ground and conductor 88 through branch conductors 88$a$ and 88$b$, each having interposed in circuit therewith individual switching transistors (typically, Type C101C of Crystalonics, Inc.), 99 for the $a$ pulse branch and 100 for the $r$ pulse branch. The base element of transistor 99 is connected through resistor 101 (typically, 4.7K ohms) to conductor 60 applying pulse signal $e_{sa}$ to sub-circuit 62, and the base element of transistor 100 is connected through resistor 102 (typically, 4.7K ohms) to conductor 59 applying pulse signal $e_{sr}$ to sub-circuit 62.

The D.-C. voltage signal $E_a$, $E_r$ generation facility is provided next in circuit with capacitors 96 and 97, this consisting of N-P-N transistors 105 and 106 (typically, Type 2N2221), connected with their collectors in common to a positive polarity D.-C. voltage source (typically, +30 v.), their base elements to capacitors 96 and 97, respectively, and their emitters connected to ground through resistors 107 and 108, respectively (each typically 10K ohms).

It is convenient to utilize a voltage dividing network consisting of potentiometer 110 connected at one terminal to the emitter of transistor 105 and at the other terminal through a voltage dropping resistor 111 of the same total resistance value as the potentiometer (typically, 10K ohms for each) to the emitter of transistor 106. Under these circumstances the potential at the mid point A of the network will be, effectively, $(E_r+E_a)/2$ referred to ground. Also, since potentials $E_a$ and $E_r$ are opposed through potentiometer 110, the potential existing at point D in electrical circuit with tap 110$a$ is a function of $(E_r-E_a)$, which is preselected in magnitude by appropriate setting of the tap along the slide-wire, thereby affording span adjustment for the apparatus.

Computation of the ratio $(E_r-E_a)/(E_r+E_a)$ is then effected by utilizing a servo-amplifier 112 powering a reversible servo motor 115 provided with a phase shift capacitor in one of its windings, 115$b$, actuated by null-balancing the voltage inputs representative of the numerator and denominator factors of the ratio. This requires the connection of point A as one input to servo-amplifier 112 via lead 114 and also through a balancing potentiometer 116 (typically 10K ohms range) connected at the opposite terminal F to ground through resistor 117 (typically, 200K ohms) and the use of a chopping switch 118 sampling, in alternation, the potential at point D and the potential existing at the tap 116$a$. With the switch blade of chopper 118 connected as the other input of servo amplifier 112, a net amplified output is delivered via motor winding 115$a$ which, when it is of the appropriate design frequency (typically, at 60 cycles chopping frequency matching the 60 cycle operating frequency of motor 115), drives tap 116$a$ via mechanical connection 120 in a direction effecting null balancing of the input. When null balance is achieved, pointer 121, driven in co-ordination with mechanical connection 120, gives, by its movement in relationship to a recording chart, a record of the ratio $(E_r-E_a)/(E_r+E_a)$ and, coincidentally, a measure of the content of the constituent in analysis.

Referring to FIG. 5, the operation of the apparatus entails the continuous obtainment of the electrical pulse wave $e_s$, which, in the form of the alternate voltage pulses, $r$ and $a$, constitute measures of the intensities of the reference and analytical radiation transmissions, repectively, passed by the sample in analysis interposed in its sample cell 29 athwart radiation path 12' (FIG. 1).

The trigger pulse train, $e_{mp}$, actuating wave shaper 56 to generate its control pulse trains must be precisely co-ordinated in time with respect to the two transmitted radiation intensity measurement pulses $r$ and $a$ of signal $e_s$, and this is accomplished by disposing the peripheral notches 46–50, inclusive, at preselected points on the periphery of chopper wheel 23 (rotating in a clockwise direction). Thus, notches 46 and 47, which, respectively, generate the pulses $C_r$ and $C_a$ of pulse train $e_{mp}$ as they sweep past electromagnetic pickup 52 (FIG. 2), are disposed equiangular amounts (typically about 35°) in advance of their associated filters 22 and 21.

The control pulses of FIG. 5 are represented in cross-hatched delineation for their "ON" states, and it will be seen that $C_r$ and $C_a$ are each effective to bring $e_c$ to its "OFF" state for approximately equal intervals of times of the same duration as the $e_c$ "ON" time. Also, $e_c$ switches "OFF" simultaneously with the arrival of the leading edges of signal pulses $r$ and $a$. Since $e_c$ is applied to the base element of transistor 76, the later conducts only during $e_c$ "ON", at which time coupling capactior 69 is connected directly to ground, thereby establishing a clamp at invariant base level C (FIG. 4), which clamping is carried over into the "OFF" period of $e_c$. This eliminates possible errors in later potential measurement upon which computation is based.

The pulse train $e_z$ is turned "ON" and "OFF" by alternate transitions of $e_c$, so that one full "ON" or "OFF" period of $e_z$, effectively corresponds to one complete "ON"-"OFF" cycle of $e_c$, with switching of $e_z$ occurring in all instances in synchronism with the leading edges of the $e_c$ pulses. Since conductor 58 introducing $e_z$ to the clamping and zero sub-circuit 61 is connected to the base element of transistor 72, the latter conducts only when $e_z$ is "ON," thereby attenuating the reference signal $r$ applied to tap 70$a$ a predetermined amount selected by appropriate positioning of the tap, which is a desirable feature, since the intensity of the transmitted reference radiation is usually much greater than the intensity of the transmitted analytical radiation.

The trigger pulses next following $C_r$ and $C_a$ are $S_r$ and $S_a$, respectively, the former generated by notch 47 and the latter by notch 50, both disposed on the common diameter of chopper wheel 23 bisecting filters 21 and 22. $S_r$ turns "ON" the brief duration pulse $e_{sr}$ centered in time within the width of pulse $r$, whereas $S_a$ turns "ON" the equally brief duration pulse $e_{sa}$ centered in time within the width of pulse $a$. Pulses $e_{sa}$ and $e_{sr}$ are both negative polarity pulses introduced to the base elements of the switching transistors 99 and 100, respectively, so as to complete briefly the electrical circuits therethrough between coupling capacitor 69 and capacitors 96 and 97 in the alternate sequence recited, thereby storing therein the corresponding capacitive measures. Thereafter, as hereinbefore described, a voltage difference measure $(E_r-E_a)$, depicted graphically on the right-hand end of pulse train $e_s$, FIG. 5, is switched into servo-amplifier 112 via the upper contact of mechanical chopper switch 118, whereas the voltage sum measure, $(E_r+E_a)/2$, is switched into the servo-amplifier via the lower contact, the graphical magnitude of the latter being also depicted in FIG. 5.

The "sync" pulse of $e_{mp}$ is generated by notch 48 disposed approximately 20 angular degrees counter-clockwise from notch 47, its function being to insure that $e_z$ is always "ON" during the time interval that transmitted reference radiation is being measured. The "sync" pulse operates, in a sense, as an over-riding coordination means to bring the phasing of $e_z$ into agreement with the receipt of pulse $r$, i.e., the measure of transmitted reference radiation. This is accomplished by providing a conventional flip-flop within wave shaper 56 which is actuated to one of its two stable states by pulses $C_r$ and $C_a$ exclusively, generated by notches 46 and 49, respectively, on the basis of a certain requisite minimum time lapse which has to succeed each of the actuation pulses before switching will occur, thereby passing over the close-following pulses $S_r$ and $S_a$. This flip-flop circuit is provided with means actuating it to its state switching $e_z$ "ON" upon the reception of the "sync" pulse, provided that $e_z$ is not already "ON." Accordingly, the "sync" signal is operative within one complete revolution of chopper wheel 23 to coordinate $e_z$ positively with pulse $r$, after which the synchronism is maintained automatically by the orderly sequential transit of notches 46–50 past electromagnetic pickup 52.

From the foregoing, it will be understood that this invention is capable of relatively wide modification within the skill of the art without departure from its essential spirit, and it is intended to be limited only by the scope of the following claims.

What is claimed is:

1. Apparatus for accumulating and processing physical data required for a comparison in the form of an approximation of the log $R/A$ as a function of the first term, $(R-A)/(R+A)$, of the series expansion representative of said log $R/A$ comprising, in combination in series electrical circuit in the order recited, means generating voltage pulses in alternation which correspond to the quantity A and the quantity R, respectively, means storing individual separate capacitive electrical charges of magnitude which are functions of said voltage pulses, means generating a D.-C. voltage signal $E_a$ which is a function of the capacitive charge corresponding to said quantity A, means generating a D.-C. voltage signal $E_r$ which is a function of the capacitive charge corresponding to said quantity R, means computing as one term the difference $(E_r-E_a)$ and as another term the sum $(E_r+E_a)$, means computing the ratio $(E_r-E_a)/(E_r+E_a)$ as an approximation of said log $R/A$, and means indicating said ratio.

2. Apparatus for accumulating and processing physical data required for a comparison in the form of an approximation of the log $R/A$ as a function of the first term, $(R-A)/(R+A)$, of the series expansion representative of said log $R/A$ according to claim 1 wherein said ratio $(E_r-E_a)/(E_r+E_a)$ is a measure of a constituent in photometric analysis wherein said means generating voltage pulses in alternation which correspond to the quantity A and the quantity R, respectively, consist of means irradiating a sample sequentially with, first, analytical radiation of a wavelength preferentially absorbed by a constituent in analysis followed by the blocking of all radiation directed to said sample for a first interval of time, and, second, reference radiation of a wavelength substantially free of absorption by said constituent in analysis but absorbed to substantially the same extent as said analytical radiation by any other constituents in said sample followed by the blocking of all radiation directed to said sample for a second interval of time, in combination with means generating a voltage proportional to A as a function of said analytical radiation transmitted by said sample and a voltage proportional to R as a function of said reference radiation transmitted by said sample.

References Cited by the Examiner
UNITED STATES PATENTS 2,775,160 12/1956 Foskett et al. _____ 88—14
2,809,290 10/1957 Kee _____ 235—197 X JEWELL H. PEDERSEN, *Primary Examiner.*

DAVID H. RUBIN, *Examiner.*

L. ORLOFF, *Assistant Examiner.*